United States Patent [19]

Sugiyama et al.

[11] Patent Number: 4,485,412

[45] Date of Patent: Nov. 27, 1984

[54] ROTARY RECORDING MEDIUM REPRODUCING APPARATUS CAPABLE OF PERFORMING HIGH-SPEED SEARCH OPERATION

[75] Inventors: Hiroyuki Sugiyama, Isehara; Masaki Sakurai; Ryozo Abe, both of Yokohama; Kenji Yoshihara, Chiba, all of Japan

[73] Assignee: Victor Company of Japan, Ltd., Yokohama, Japan

[21] Appl. No.: 357,209

[22] Filed: Mar. 11, 1982

[30] Foreign Application Priority Data

Mar. 12, 1981 [JP] Japan .............................. 56-34505[U]

[51] Int. Cl.³ ........................................... H04N 9/491
[52] U.S. Cl. .................................... 358/310; 358/319;
358/342; 360/37.1; 360/72.2; 369/32
[58] Field of Search ............... 358/310, 314, 319, 335,
358/336, 342; 360/33.1, 37.1, 38.1, 72.2;
369/30, 32, 111, 124

[56] References Cited

U.S. PATENT DOCUMENTS 4,340,949  7/1982  Kelleher .............................. 369/32
4,387,407  6/1983  Wine .................................... 358/336
4,409,626 10/1983  Ferguson .......................... 358/336

Primary Examiner—Alan Faber
Attorney, Agent, or Firm—Louis Bernat

[57] ABSTRACT

A rotary recording medium reproducing apparatus comprises a transferring circuit for transferring a reproducing element for reproducing a rotary recording medium, along a radial direction of the rotary recording medium, where the transferring circuit transfers the reproducing element at a normal speed during a normal reproduction mode, and transfers the reproducing element at a speed higher than the normal speed during a search mode in which a search is performed with respect to a desired reproducing position on the rotary recording medium, a synchronizing signal generating circuit for generating a synchronizing signal consisting of a horizontal synchronizing signal and a vertical synchronizing signal synchronized with a synchronizing signal within a video signal reproduced by the reproducing element during the search mode, a switching circuit for selectively passing the video signal reproduced by the reproducing element and the synchronizing signal obtained from the synchronizing signal generating circuit, and a control circuit for controlling and switching the switching circuit so that the switching circuit passes the video signal reproduced by the reproduced element during the normal mode and passes the synchronizing signal obtained from the synchronizing signal generating circuit during the search mode. The signal passed through the switching circuit is supplied to a television receiver.

6 Claims, 5 Drawing Figures

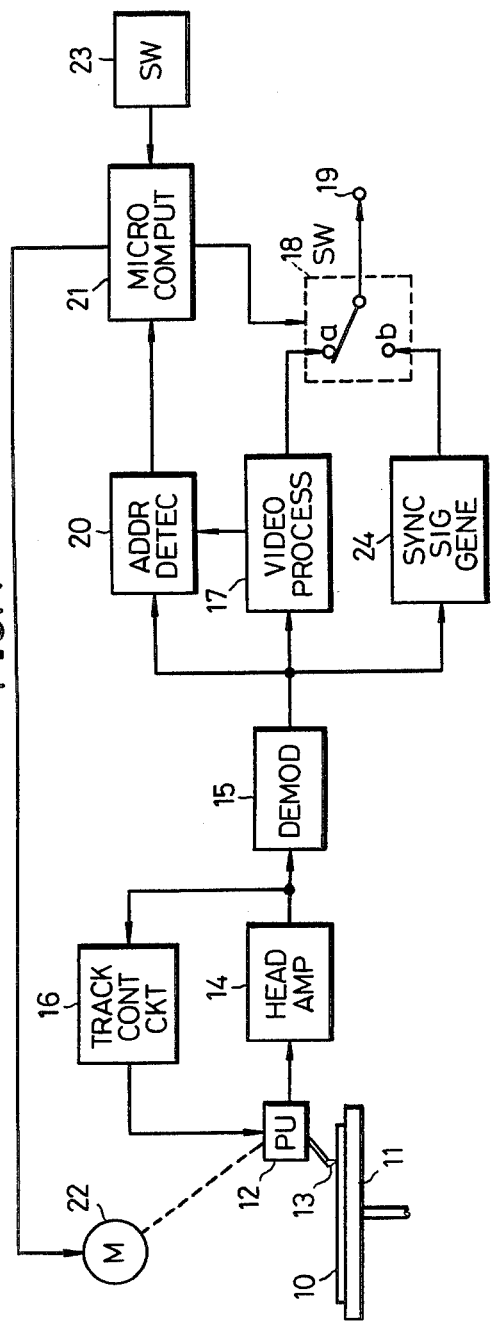
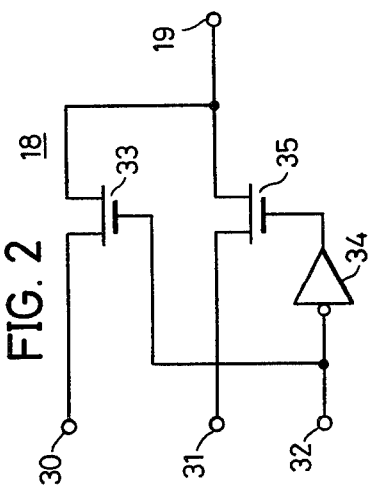

ROTARY RECORDING MEDIUM REPRODUCING APPARATUS CAPABLE OF PERFORMING HIGH-SPEED SEARCH OPERATION

BACKGROUND OF THE INVENTION

The present invention generally relates to rotary recording medium reproducing apparatuses capable of performing high-speed search operations, and more particularly to a rotary recording medium reproducing apparatus in which, during a high-speed search when a reproducing element is transferred along a radial direction of a rotary recording medium at a high speed in search of a predetermined reproducing position, muting is performed with respect to a video signal reproducing system so that an unclear and unpleasant picture is not reproduced during this high-speed search, and synchronism is immediately obtained as the muting is released in order to obtain a fine reproduced picture.

There are cases where it is desirable to reproduce an information signal of a predetermined program from the beginning of that program, from a rotary recording medium (hereinafter simply referred to as a disc) which is recorded with information signals such as a video signal and an audio signal of a plurality of programs. In such a case, the disc reproducing apparatus is set to a high-speed search mode to search for a predetermined reproducing position on the disc, by transferring the reproducing element along the radial direction of the disc at a high speed.

However, when the above high-speed search is being performed, the video information signal is not reproduced in a normal manner. Accordingly, the reproduced picture in a television receiver which is supplied with the reproduced signal of the reproducing apparatus during this high-speed search mode, becomes full of noise and the picture is unclear and unpleasant to watch.

Hence, a method was conventionally tested in which a muting switch is provided in the video signal reproducing system. During the high-speed search, the video signal reproducing system is open circuited by the muting switch so that the reproduced signal is not supplied to the television receiver. Thus, by use of this method, it was possible to prevent the unclear and unpleasant picture from being reproduced in the television receiver during the high-speed search.

However, since the reproduced video signal is not supplied to the television receiver during the above high-speed search, the television receiver is not synchronized with the reproduced video signal during the high-speed search. Therefore, if an attempt is made to perform normal reproduction immediately after completion of the high-speed search in order to obtain the reproduced picture, there was a disadvantage in that the reproduced picture will not lock and become unstable with respect to the vertical direction of the reproduced picture, since synchronism is not obtained between the television receiver and the reproduced video signal upon starting of the normal reproduction.

SUMMARY OF THE INVENTION

Accordingly, it is a general object of the present invention to provide a novel and useful rotary recording medium reproducing apparatus capable of performing high-speed search operation, in which the above described disadvantages have been overcome.

Another and more specific object of the present invention is to provide a rotary recording medium reproducing apparatus in which muting is performed during a high-speed search so that a reproduced video signal is not supplied to a television receiver, and a synchronizing signal formed from a synchronizing signal within the reproduced video signal is supplied to the television receiver in order to obtain synchronism between the synchronizing signal within the reproduced video signal of the reproducing apparatus and the television receiver during the high-speed search.

Still another object of the present invention is to provide a rotary recording medium reproducing apparatus in which muting is performed during a high-speed search so that a reproduced video signal is not supplied to a television receiver, and a synchronizing signal formed from a synchronizing signal within the reproduced video signal is supplied to the television receiver in order to obtain synchronism between the synchronizing signal within the reproduced video signal of the reproducing apparatus and the television receiver during the high-speed search, and further, a picture of a predetermined pattern, color, and the like is reproduced in the picture screen of the television receiver during the high-speed search.

Other objects and further features of the present invention will be apparent from the following detailed description when read in conjunction with the accompanying drawings.

BRIEF DESCRIPTION OF THE DRAWINGS

FIG. 1 is a systematic block diagram showing a first embodiment of a rotary recording medium reproducing apparatus according to the present invention;

FIG. 2 is a circuit diagram showing an example of an electronic switch in the block system shown in FIG. 1;

DETAILED DESCRIPTION

Figure 3:
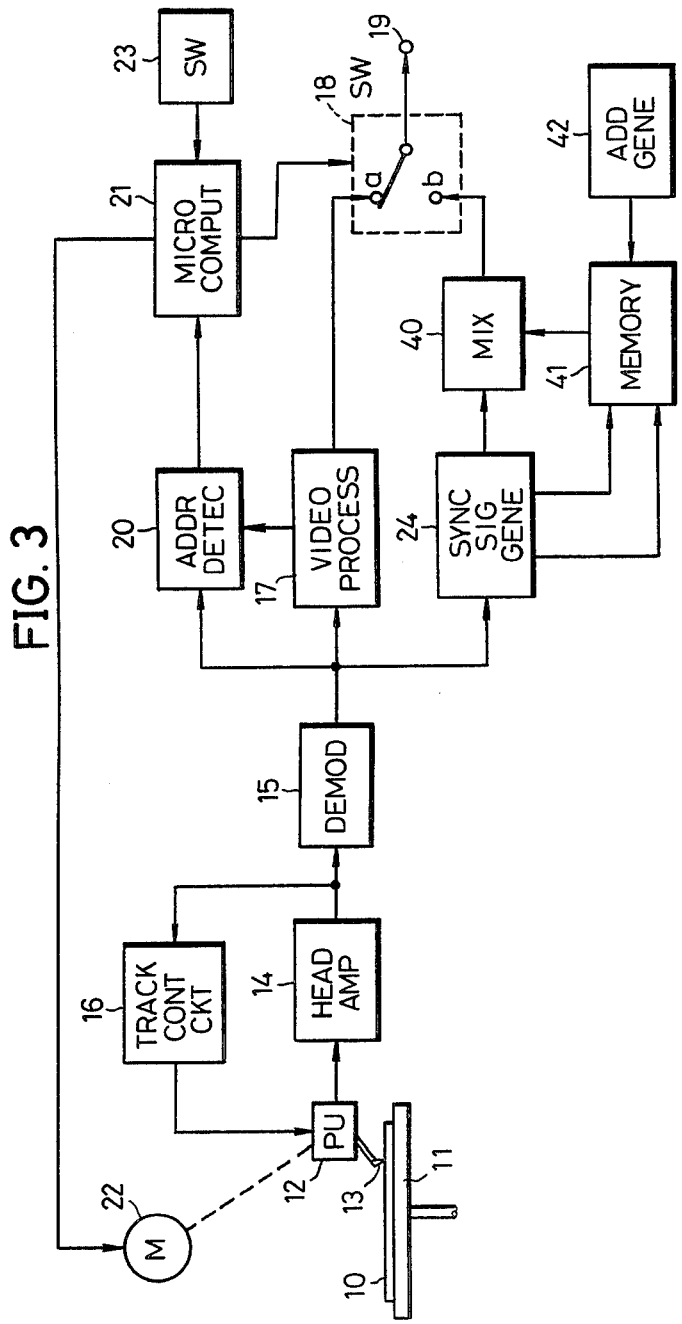
FIG. 3 is a systematic block diagram showing a second embodiment of a rotary recording medium reproducing apparatus according to the present invention.

In FIG. 1, a disc 10 which is recorded with an information signal such as a video signal and an audio signal, is placed onto a turntable 11 and rotated at a predetermined rotational speed. A reproducing stylus 13 of a signal pickup device 12 makes contact with a recording surface of the rotating disc 10, to pick up and reproduce the recorded signal. In the present embodiment of the invention, the information signal is recorded on the disc 10 as variations in geometrical configuration. The recorded information signal is reproduced according to variations in the electrostatic capacitance formed between the disc 10 and the reproducing stylus 13. Besides the above information signal, the disc 10 is also recorded with reference signals for tracking control. These reference signals are reproduced together with the information signal.

The signal thus picked up and reproduced by the signal pickup device 12, is supplied to a demodulator 15 and a tracking control circuit 16, through a head amplifier 14. The reference signals for tracking control are separated at the tracking control circuit 16 and a tracking control signal is formed from these reference signals. The tracking control signal is supplied to a tracking control coil of the signal pickup device 12. Accordingly, tracking control is performed so that the reproducing stylus 13 accurately traces over video signal tracks.

During a normal reproduction mode, the information signal thus picked up is supplied to a video signal processing circuit 17 after being demodulated at the demodulator 15. The signal supplied to the video signal processing circuit 17 is subjected to a predetermined signal processing, and obtained from an output terminal 19 through a switch 18 having a contact piece connected to the side of a contact point a. The reproduced video signal from the output terminal 19 is supplied to a television receiver, and reproduced as a picture image in a picture screen.

Next, when a high-speed search is performed, the address of a predetermined position on the disc which is to be searched, is set in a micro computer 21 through a switch 23. When the high-speed search operation is started a feed motor 22 for feeding the signal pickup device 12 is rotated at a high speed, by a command from the micro-computer 21. Accordingly, the signal pickup device 12 is transferred along the radial direction of the disc 10 at a high speed. Moreover, the contact piece of the switch 18 is swithced and connected to the side of a contact point b, by a command from the micro-computer 21.

The signal pickup device 12 picks up the recorded signal even as the signal pickup device 12 is transferred at the high speed. The signal thus picked up is supplied to the above video signal processing circuit 17 through the head amplifier 14 and the demodulator 15, and also supplied to an address detector 20 and a synchronizing signal generator 24. The address detector 20 detects the address of the reproduced signal, and supplies the detected address to the micro-computer 21. The micro-computer 21 causes the reproducing apparatus to continuously perform the high-speed search until the detected address coincides with address set through the switch 23.

During the high-speed search mode, the contact piece of the switch 18 is connected to the side of the contact point b as described above. Hence, the output video signal of the video signal processing circuit 17 is interrupted at the switch 18, and therefore not obtained through the output terminal 19. Quite a number of noise is included within the reproduced signal during the above high-speed search mode, since the reproducing stylus 13 of the signal pickup device 12 successively and continuously shifts over the tracks. However, this reproduced video signal including the large number of noise is interrupted at the switch 18, and is not supplied to the television receiver. Accordingly, an unclear and unpleasant picture full of noise, is prevented from being reproduced in the picture screen of the television receiver.

The synchronizing signal generating circuit 24 may have a known circuit construction. For example, the synchronizing signal generating circuit 24 comprises a crystal oscillator for producing a signal having a frequency of 14.3 MHz, and a circuit for generating a horizontal synchronizing signal having a frequency of 15.7 kHz and a vertical synchronizing signal having a frequency of 60 Hz by using the signal from the crystal oscillator as a clock pulse. In the present embodiment of the invention, the circuit within the synchronizing signal generating circuit 24 for generating the horizontal and vertical synchronizing signals, is reset by a synchronizing signal within the reproduced video signal which is supplied from the demodulator 15. Hence, the horizontal and vertical synchronizing signals obtained from the synchronizing signal generating circuit 24 are in synchronism with the synchronizing signal within the reproduced video signal.

The horizontal and vertical synchronizing signals from the synchronizing signal generating circuit 24 are respectively obtained from the output terminal 19, through the switch 18 having the contact piece connected to the side of the contact point b, and then supplied to the television receiver. Accordingly, the television receiver is indirectly synchronized with the synchronizing signal within the reproduced video signal even during the high-speed search mode, by the horizontal and vertical synchronizing signals obtained from the synchronizing signal generating circuit 24.

When the reproducing stylus 13 of the signal pickup device 12 reaches the predetermined reproducing position on the disc and the address detected by the address detector 20 coincides with the address set in the micro-computer 21, the rotational speed of the feed motor 22 is returned to the normal rotational speed from the high rotational speed by a command from the micro-computer 21. In addition, the contact piece of the switch 18 is switched to the side of the contact point a by a command from the micro-computer 21. Therefore, a normal reproduced video signal from the signal pickup device 12 which has passed through the head amplifier 14, the demodulator 15, and the video signal processing circuit 17, is supplied to the television receiver through the switch 18 and the output terminal 19.

When the above normal reproduced video signal is supplied to the television receiver the television receiver is in a synchronized state up to that point by the synchronizing signals from the synchronizing signal generating circuit 24. Hence, the reproduced picture remains stable when the reproduced video signal is supplied to the television receiver, and a fine reproduced picture is immediately obtained.

In FIG. 1, the switch 18 is shown as a switch having the contact piece and the contact points a and b. However, in reality, an electronic switch shown in FIG. 2 is used which uses this principle. In FIG. 2, a terminal 30 is connected to the video signal processing circuit 17. In addition, a terminal 31 is connected to the synchronizing signal generating circuit 24, while a terminal 32 is connected to the micro-computer 21. During a normal reproduction mode, the signal supplied to the terminal 32 from the micro-computer 21, is applied to the gate terminal of a field effect transistor (FET) 33, and the gate terminal of an FET 35 through an inverter 34. Thus, the FET 33 is turned ON, and the FET 35 is turned OFF. Accordingly, the synchronizing signals from the terminal 31 are interrupted, and the reproduced video signal from the terminal 30 is obtained through the output terminal 19. On the other hand, during a high-speed search mode, the polarity of the signal supplied to the terminal 32 from the micro-computer 21 reverses. Hence, the FET 33 is turned OFF and the FET 35 is turned ON. Therefore, during the high-speed search mode, the reproduced video signal from the terminal 30 is interrupted, and the synchronizing signals from the terminal 31 are obtained through the output terminal 19.

Next, description will be given with respect to a second embodiment of an apparatus according to the present invention, by referring to FIG. 3. In FIG. 3, those parts which are the same as those corresponding parts in FIG. 1 are designated by the same reference numerals, and their description will be omitted.

During a high-speed search mode, the horizontal and vertical synchronizing signals from the synchronizing signal generating circuit 24 are supplied to a mixer 40, and also supplied to a memory 41 constructing a character generator. For example, a video information of one frame for displaying characters such as "ON SEARCH", is stored in the memory 41. During the above high-speed search mode, a video information stored in the memory 41 is read out from a specified address according to a clock signal and an address specifying signal supplied from an address generator 42, in synchronism with the synchronizing signals obtained from the synchronizing signal generating circuit 24. The video information thus read out from the memory 41, is supplied to the mixer 40.

The synchronizing signals from the synchronizing signal generating circuit 24 and the video information of characters read out from the memory 41 are mixed at the mixer 40, and the mixed output is supplied to the television receiver through the switch 18 having the contact piece connected to the side of the contact point b. Accordingly, the characters "ON SEARCH" are displayed in the picture screen of the television receiver during the high-speed search mode.

According to the present embodiment of the invention, the noise is not introduced in the picture screen during the high-speed search, and further, the characters "ON SEARCH" are displayed in the picture screen of the television receiver. Hence, the operator can easily realize that the reproducing apparatus is in a high-speed search mode, by looking at the picture screen of the television receiver.

When the high-speed search is completed, the contact piece of the switch 18 is switched and connected to the side of the contact point a, as in the above described first embodiment of the invention. Thus, the reproduced picture remains stable, and a fine and synchronized normal reproduction picture is immediately obtained.

The video information stored in the memory 41 is not limited to the above "ON SEARCH", and can be a video information of other characters, suitable picture patterns, and the like.

Figures 4, 5:
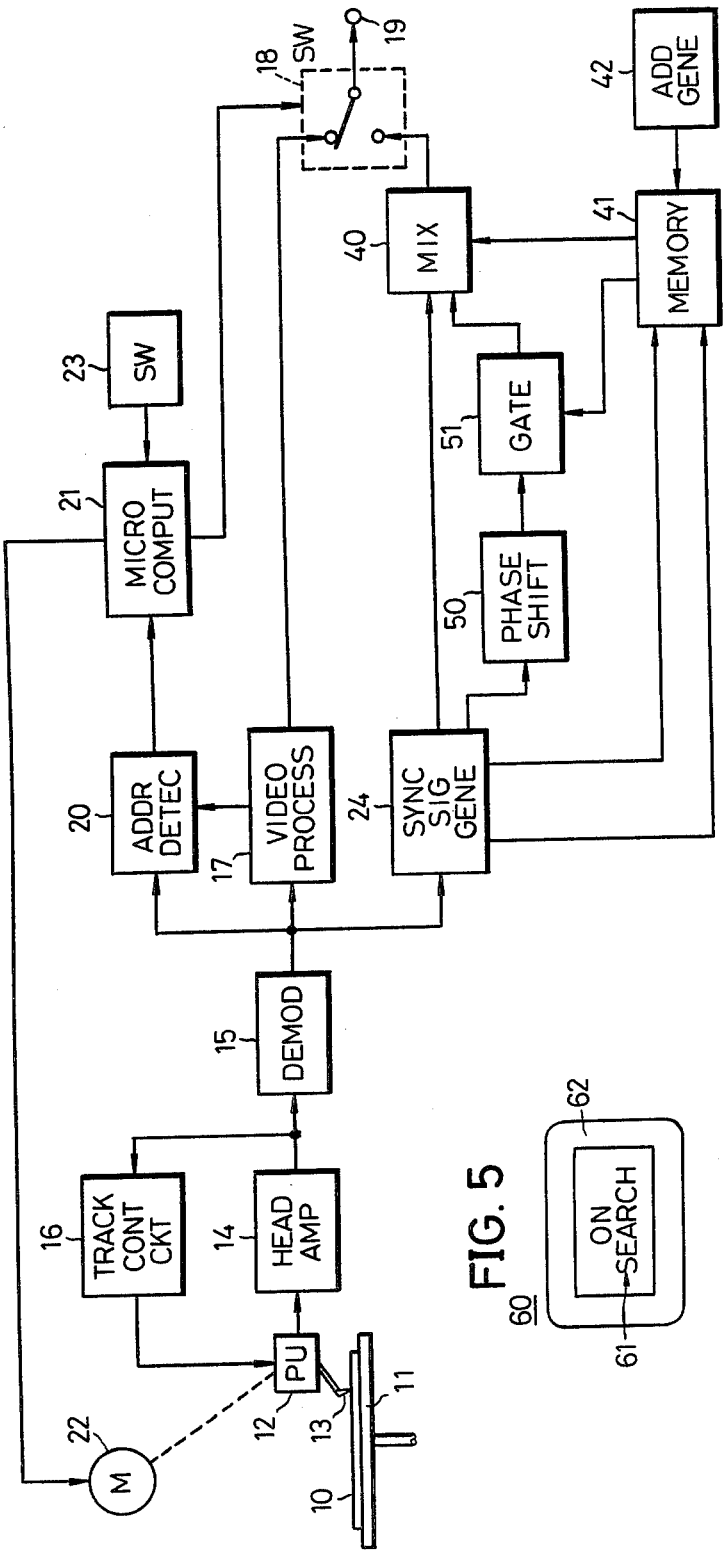
FIG. 4 is a systematic block diagram showing a third embodiment of a rotary recording medium reproducing apparatus according to the present invention and FIG. 5 shows a picture screen in a television receiver during a high-speed search performed in the apparatus shown in FIG. 4.

Next, description will be given with respect to a third embodiment of an apparatus according to the present invention, by referring to FIG. 4. In FIG. 4, those parts which are the same as those corresponding parts in FIGS. 1 and 3 are designated by the same reference numerals, and their description will be omitted.

During a high-speed search mode, the horizontal and vertical synchronizing signals from the synchronizing signal generating circuit 24 are supplied to the mixer 40 and the memory 41. As in the above second embodiment of the invention described in conjunction with FIG. 3, the character information "ON SEARCH" read out from the memory 41, is supplied to the mixer 40.

On the other hand, a signal obtained from an output of the crystal oscillator within the synchronizing signal generating circuit 24 having a frequency of 3.58 MHz which is equal to the chrominance subcarrier frequency, is supplied to a phase shifter 50 wherein the phase is shifted by a predetermined angle. An output of the phase shifter 50 is gated by a gating signal from the memory 41, at a gate 51. This gating signal is a signal corresponding to the horizontal and vertical scanning positions exterior to a frame surrounding a part displaying the characters "ON SEARCH" which is read out from the memory 41 according to the address specified by the address generator 42. Accordingly, the output signal of the phase shifter 50 is supplied to the mixer 40 as a chrominance signal, only during the interval when the part exterior to the frame surrounding the character display "ON SEARCH" is scanned.

The synchronizing signals from the synchronizing signal generating circuit 24, the character information from the memory 41, and the chrominance signal from the gate 51, are respectively mixed at the mixer 40. The mixed output is supplied to the television receiver through the switch 18 having the contact piece connected to the side of the contact point b.

As shown in FIG. 5, in a picture screen 60 of the television receiver supplied with the above mixed output signal, characters 61 obtained from the memory 41 indicating "ON SEARCH" is displayed in a state where synchronism is obtained by the synchronizing signals from the synchronizing signal generating circuit 24. Furthermore, a part 62 corresponding to a part exterior to a frame surrounding the above characters 61, is colored by the chrominance signal obtained from the phase shifter 50.

The color of the above part 62 in the picture screen 60, can be selected to a desired color by suitably setting the phase shifting angle of the phase shifter 50. If the color of the part 62 can be limited to a specific color, the phase shifter 50 may be omitted to supply the signal having the frequency of 3.58 MHz which is obtained from the synchronizing signal generating circuit 24 to the gate 51 as it is.

Further, the present invenition is not limited to these embodiments, but various variations and modifications may be made without departing from the scope of the present invention.

What is claimed is:

1. A rotary recording medium reproducing apparatus comprising:
   transferring means for transferring a reproducing element for reproducing a rotary recording medium, along a radial direction of said rotary recording medium, said transferring means transferring said reproducing element at a normal speed during a normal reproduction mode, and transferring said reproducing element at a speed higher than said normal speed during a search mode in which a search is performed with respect to a desired reproducing position on said rotary recording medium;
   synchronizing signal generating means for generating a synchronizing signal consisting of a horizontal synchronizing signal and a vertical synchronizing signal synchronized with a synchronizing signal within a video signal reproduced by said reproducing element during said search mode;
   switching means for selectively passing the video signal reproduced by said reproducing element and the synchronizing signal obtained from said synchronizing signal generating means; and
   control means for controlling and switching said switching means so that said switching means passes the video signal reproduced by said reproducing element during the normal mode and passes the synchronizing signal obtained from said synchronizing signal generating means during the search mode, the signal passed through said switching means being supplied to a television receiver.

2. A rotary recording medium reproducing apparatus as claimed in claim 1 in which said control means switches said switching means according to the operational mode of the reproducing apparatus, and also controls and switches the transferring speed of said transferring means.

3. A rotary recording medium reproducing apparatus as claimed in claim 1 further comprising:

memory means stored with a predetermined pattern information, from which the stored predetermined pattern information is read out in synchronism with the synchronizing signal obtained from said synchronizing signal generating means; and mixing means for mixing the predetermined pattern information read out from said memory means and the synchronizing signal obtained from said synchronizing signal generating means, to supply a mixed output to said switching means, said switching means passing the output signal of said mixing means during the search mode.

4. A rotary recording medium reproducing apparatus as claimed in claim 3 in which said predetermined pattern information is a character information indicating that said reproducing apparatus in a search mode.

5. A rotary recording medium reproducing apparatus as claimed in claim 3 further comprising color pattern signal supplying means for supplying a color pattern signal, said color pattern signal supplied from said color pattern signal supplying means being applied to said mixing means.

6. A rotary recording medium reproducing apparatus as claimed in claim 5 in which said synchronizing signal generating means generates a signal having a frequency equal to the chrominance subcarrier frequency of the video signal as a chrominance signal, and said color pattern signal supplying means comprises:

phase shifting means for shifting the phase of the chrominance signal thus produced; and gating means for passing an output signal of said phase shifting means so that the output signal of said phase shifting means corresponds to positions other than the vertical and horizontal scanning positions of the predetermined pattern information read out from said memory means.

* * * * *